(12) United States Patent
Roger et al.

(10) Patent No.: US 10,562,598 B1
(45) Date of Patent: Feb. 18, 2020

(54) RETRIEVER SYSTEM FOR A MARINE EQUIPMENT AND METHOD

(71) Applicant: SERCEL, Carquefou (FR)

(72) Inventors: Thierry Roger, Carquefou (FR);
Philippe Nauraye, Carquefou (FR);
Jean-Jacques Vignaux, Carquefou (FR); Francois Barbin, Carquefou (FR)

(73) Assignee: SERCEL, Carquefou (FR)

( * ) Notice: Subject to any disclaimer, the term of this patent is extended or adjusted under 35 U.S.C. 154(b) by 0 days.

(21) Appl. No.: 16/205,796

(22) Filed: Nov. 30, 2018

(51) Int. Cl.
*B63B 22/12* (2006.01)
*B63B 22/04* (2006.01)
*B63B 22/20* (2006.01)
*G01V 1/38* (2006.01)

(52) U.S. Cl.
CPC .............. *B63B 22/04* (2013.01); *B63B 22/20* (2013.01); *B63B 2211/02* (2013.01); *G01V 1/3817* (2013.01)

(58) Field of Classification Search
CPC ...... G01V 2001/207; B63C 7/10; B63B 22/22
See application file for complete search history.

(56) References Cited

U.S. PATENT DOCUMENTS 7,540,796 B2 * 6/2009 Spears ................... B63B 22/08
441/8

* cited by examiner

*Primary Examiner* — Sean D Andrish
(74) *Attorney, Agent, or Firm* — Ipsilon USA, LLP (57) ABSTRACT

A retriever system for retrieving a marine equipment. The retriever system comprises a hollow body having a first opening, a cap adapted to close the first opening of the hollow body and adapted to be removed. A buoyancy assembly housed in the hollow body and adapted to exit the hollow body when the cap is removed. A linkage system maintains the buoyancy assembly linked to the hollow body of the retriever system. The buoyancy assembly comprises first inflatable element and a second inflatable element, and an inflating system configured to, when activated, inflate the first inflatable element, so as to enable exiting of at least the second inflatable element of the buoyancy assembly out of the hollow body. Said inflating system is configured to start or to continue inflating the second inflatable element when said second inflatable element is out of the hollow body.

18 Claims, 4 Drawing Sheets

RETRIEVER SYSTEM FOR A MARINE EQUIPMENT AND METHOD

TECHNICAL FIELD

Embodiments of the subject matter disclosed herein generally relate to methods and systems and, more particularly, to mechanisms and techniques for retrieving a marine equipment.

DISCUSSION OF THE BACKGROUND

It is sought more particularly here below in this document to describe problems existing in the field of seismic data acquisition for oil prospecting industry. The invention of course is not limited to this particular field of application but is of interest for any technique that has to cope with closely related or similar issues and problems.

Marine seismic data acquisition and processing generate a profile (image) of the geophysical structure (subsurface) under the seafloor.

While this profile does not provide an accurate location for oil and gas, it suggests, to those trained in the field, the presence or absence of oil and/or gas. Thus, providing a high-resolution image of the subsurface is an ongoing process for the exploration of natural resources, including, among others, oil and/or gas.

Figure 1:
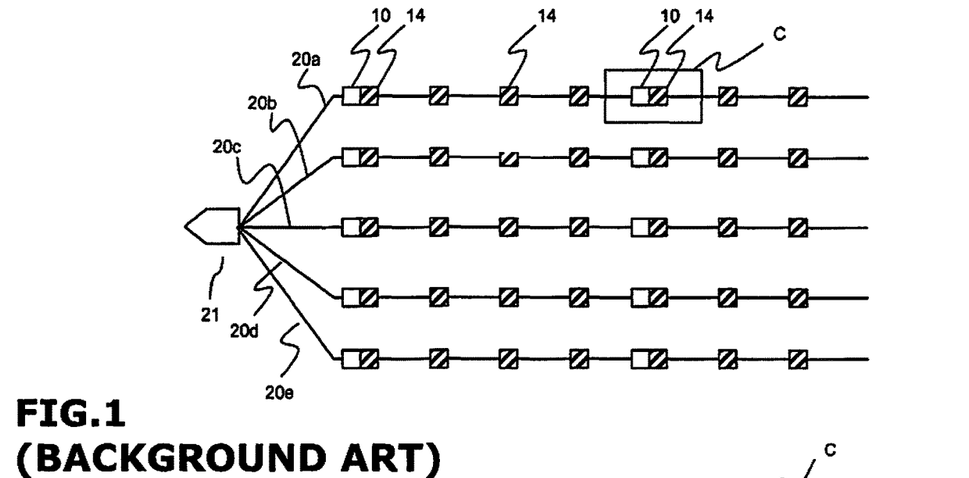
FIG. 1 already described with reference to the prior art, presents an example of network of seismic streamers towed by a seismic vessel.

The operations of acquiring seismic data on site conventionally use networks of seismic sensors, like accelerometers, geophones or hydrophones. We consider below the context of seismic data acquisition in a marine environment, in which the seismic sensors are hydrophones. The hydrophones are distributed along cables in order to form linear acoustic antennas (also referred to as "streamers" or "seismic streamers"). As shown in FIG. 1, a seismic vessel 21 tows the network of seismic streamers 20a to 20e. The hydrophones are referenced 16 in FIG. 2, which illustrates in detail the block referenced C in FIG. 1 (i.e. a portion of the streamer referenced 20a).

The seismic method is based on an analysis of reflected seismic waves. Thus, to collect geophysical data in a marine environment, one or more submerged seismic sources are activated in order to propagate omnidirectional seismic wave trains. The pressure wave generated by the seismic source(s) passes through the column of water and propagates through the different layers of the seabed. The reflected seismic waves (i.e. reflected acoustic signals) are then detected by the hydrophones distributed over the length of the seismic streamers. These acoustic signals are processed and retransmitted by telemetry from the seismic streamers to the operator station situated on the seismic vessel, where the processing of the raw data is carried out (in an alternative solution, the seismic acoustic signals are stored for a later processing).

During seismic surveys, it is important to precisely locate the streamers in particular for monitoring the position of the hydrophones (distributed along the seismic streamers) in order to obtain a satisfactory precision of the image of the seabed in the exploration zone; for detecting the movements of the streamers with respect to one another (the streamers are often subjected to various external natural constraints of variable magnitude, such as the wind, waves, currents); and for monitoring the navigation of streamers, in particular in a situation of bypassing an obstacle (such as an oil barge).

Control of the positions of streamers lies in the implementation of navigation control devices (also referred to as "birds") (white squares referenced 10 in FIG. 1). They are installed at regular intervals (every 300 meters for example) along the seismic streamers.

Examples of birds are disclosed in U.S. Pat. No. 9,475,553, the entire content of which is incorporated herein by reference.

The function of birds is to guide the streamers between themselves. In other words, the birds 10 are used to control the depth as well as the lateral position of the streamers.

Figure 2:
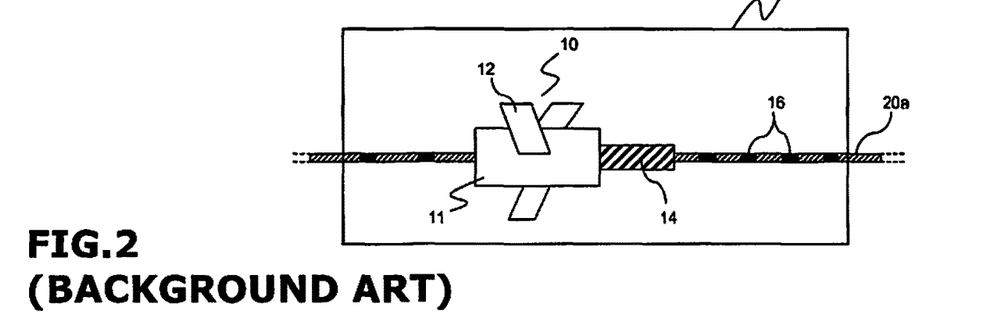
FIG. 2, already described with reference to the prior art, illustrates in detail the block referenced C in FIG. 1 (i.e. a portion of the streamer)

For this purpose, and as illustrated in FIG. 2, each bird 10 includes a body 11 equipped with motorized pivoting wings 12 (or more generally means of mechanical moving) making it possible to modify the position of the streamers laterally between them (this is referred to a horizontal driving) and drive the streamers in immersion (this is referred to a vertical driving).

To carry out the localization of the seismic streamers (allowing a precise horizontal driving of the streamers by the birds), acoustic nodes are distributed along the streamers. These acoustic nodes are represented by hatched squares, referenced 14, in FIGS. 1 and 2. As shown in FIG. 1, some acoustic nodes 14 of the network are integrated in a bird 10 (case of FIG. 2), and others are not.

Birds must be reliable and robust to keep depth and lateral control on the equipment constituted by the birds themselves and by the instrumented cables of the streamers.

As any electromechanical equipment, a bird can face internal failures that can lead to a loss of control. Furthermore, a bird and a sub-sea equipment are exposed to harsh environment, such as ice, fishing nets or debris, that can damage it, the bird being then likely to breaking down, not responding to the orders, or loosing control.

In case of loss of control or other failure of a bird, the following damages can occur. Sensors can be affected by an excessive depth of the streamer. There can be a mechanical deformation on cable and/or birds due to excessive depth, overload, excessive torsion or tangle between the cables.

Other external failures may occur such as the failure of the vessel or of the monitoring system, leading to damages of the sensors and/or birds and/or streamers. Indeed, as already said, the streamers and birds are exposed to a harsh environment, and a portion of streamer may be cut, for example by a shark, an excessive tension or an excessive twisting or by hanging to an anchor.

A known solution is to add additional equipment, commonly called "retriever", to the marine equipment, such as the bird, that is to be retrieved.

A retriever system is for example known from U.S. Pat. No. 5,404,339. The retriever system comprises a hollow body that includes a big bag and a bottle of gas for blowing the bag when predetermined excessive depth is reached by the retriever so that the big bag exits the hollow body.

However, known retriever systems have drawbacks. In particular, it happens that the big bag be damaged when exiting the hollow body. Furthermore, known retriever systems are cumbersome causing noise on surrounding sensors. Also, it requires significant space for storage on board a vessel. Finally, it is heavy to handle during operations on a vessel deck.

Thus, there is a need to provide retriever systems and methods for retrieving marine equipment that enable to overcome at least part of the drawbacks of the known retriever systems.

SUMMARY

According to an embodiment, there is a retriever system for retrieving a marine equipment, said retriever system comprising:

a hollow body having a first opening, a cap adapted to close the first opening of the hollow body and adapted to be removed to free said first opening, a buoyancy assembly housed in the hollow body and adapted to exit the hollow body when the cap is removed, a linkage system to maintain the buoyancy assembly linked to the hollow body of the retriever, when said buoyancy assembly is out of said hollow body of the retriever, wherein said buoyancy assembly comprises:

a first inflatable element and a second inflatable element, an inflating system configured to, when activated, inflate the first inflatable element, so as to enable exiting of at least the second inflatable element of the buoyancy assembly out of the hollow body, said inflating system being configured to start or to continue inflating the second inflatable element when said second inflatable element is out of the hollow body.

According to a particular aspect, the retriever system is configured so that, when the inflating system is activated, the first inflatable element is inflated at least partially before inflation of the second inflatable element.

According to a particular aspect, the retriever system comprises a valve system that can be moved between:

a closed position wherein the valve system closes a second opening of the hollow body, and an opened position wherein said second opening of the hollow body is opened so as to let external water enter the hollow body.

According to a particular aspect, the first inflatable element is configured to, when being inflated, move the valve system from the closed position to the opened position.

According to a particular aspect, the retriever system comprises a coupling interface that is coupled to the valve system and that partially covers the first inflatable element when the cap closes the first opening of the hollow body, to enable guiding of the movement of the valve system from the closed position to the opened position when the first inflatable element is inflating, while letting the first inflatable element exit out the hollow body through the first opening once the cap is removed.

According to a particular aspect, an area of an outer surface of the cap, that corresponds to a surface of the cap that is in contact with water when in a closing position of the cap and when the retriever system is underwater, is defined in function of:

an area of the outer surface of the valve system, that corresponds to a surface of the valve system that is in contact with water when in the closed position of the valve system and when the retriever system is underwater, and water depth, or corresponding pressure, at which the inflating system is intended to be activated.

According to a particular aspect, the inflating system comprises:

an inflating generator and an activation system to activate the inflating generator to provide the first inflatable element with gas;

and a valve mechanism that is configured to:

prevent inflating of the second inflatable element while said second inflatable element extends inside the hollow body, and enable said inflating of the second inflatable element after the second inflatable element has exited the hollow body.

According to a particular aspect, the valve mechanism includes a spring and a closing element that is movable between a closing position wherein the closing element closes a gas communication path between the first inflatable element and the second inflatable element, and an opening position wherein the closing element frees the gas communication path between the first inflatable element and the second inflatable element, wherein, when the buoyancy assembly is housed in the hollow body, the closing element is maintained in the closing position by the hollow body that prevents the closing element to be moved by the spring in the opening position, and, when the portion of the buoyancy assembly that has the valve mechanism, has exited the hollow body, the closing element is moved in the open position by said spring to free the gas communication path.

According to a particular aspect, at least part of the inflating system is inside the second inflatable element.

According to a particular aspect, the first inflatable element is configured to, when inflated and having exited the hollow body, present an elongated shape.

According to a particular aspect, the second inflatable element is configured to, when inflated and having exited the hollow body, present a spherical shape.

According to a particular aspect, the retriever system comprises an attachment system, for instance a pin or a plastic screw, configured to enable attachment of the cap to the hollow body in a position wherein the cap closes said opening, said attachment system being configured for failing in predefined conditions, for instance when a predefined force or pressure is applied to the cap.

According to another embodiment, there is an assembly comprising:

a marine equipment, and a retriever system as discussed above, said retriever system being coupled to said marine equipment.

According to a particular aspect, the marine equipment being a control device, referred to as a bird, having at least two wings for controlling a position of an instrumented cable, referred to as a streamer, adapted to be towed in water, the retriever system extends between said at least two wings of the control device.

According to a particular aspect, the marine equipment comprising a pressure detection system, the inflating system is configured to be activated in function of a pressure detected by said pressure detection system.

According to another embodiment, there is a method for retrieving a marine equipment coupled to a retriever system as discussed above, wherein the method comprises the following steps:

inflating the first inflatable element causing exit, from the hollow body, of at least the second inflatable element of the buoyancy assembly, and inflating the second inflatable element that has exited the hollow body.

According to another embodiment, there is a retriever system for retrieving a marine equipment, said retriever system comprising:

a hollow body having a first opening, a cap adapted to close the first opening of the hollow body and adapted to be removed to free said first opening, a buoyancy assembly housed in the hollow body and adapted to exit the hollow body when the cap is removed, a linkage system to maintain the buoyancy assembly linked to the hollow body of the retriever system, when said buoyancy assembly is out of said hollow body of the retriever, wherein said buoyancy assembly comprises:
an inflatable element,
an inflating system configured to, when activated, inflate said inflatable element,
a valve system that can be moved between:
a closed position wherein the valve system closes a second opening of the hollow body, and
an opened position wherein said second opening of the hollow body is opened so as to let external water enter the hollow body, the inflatable element being configured to, when being inflated, move the valve system from the closed position to the opened position.

According to another embodiment, there is a method for retrieving a marine equipment coupled to a retriever system as discussed above, wherein the method comprises inflating said inflatable element to move the valve system from the closed position to the opened position that lets external water enter the hollow body so as to ease expulsion of the cap by the force exerted by the inflatable element directly or indirectly on the cap.

LIST OF FIGURES

The invention is described in more detail below by way of the figures that show embodiments of the invention.

DESCRIPTION

The following description of the embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to various embodiments, it is proposed a retriever system 1 coupled to a marine equipment.

The retriever system 1 can be coupled to the marine equipment 9 by using for instance clamping means. The retriever system 1 can be clamped directly on the streamer through collars, or clamped on positioning devices, or inserted inline along the streamer (dedicated inline module).

According to various embodiments, the retriever system 1 may be integrated in the marine equipment. In particular, the body of the retriever system may be part of the corresponding body of the marine equipment.

Figure 3:
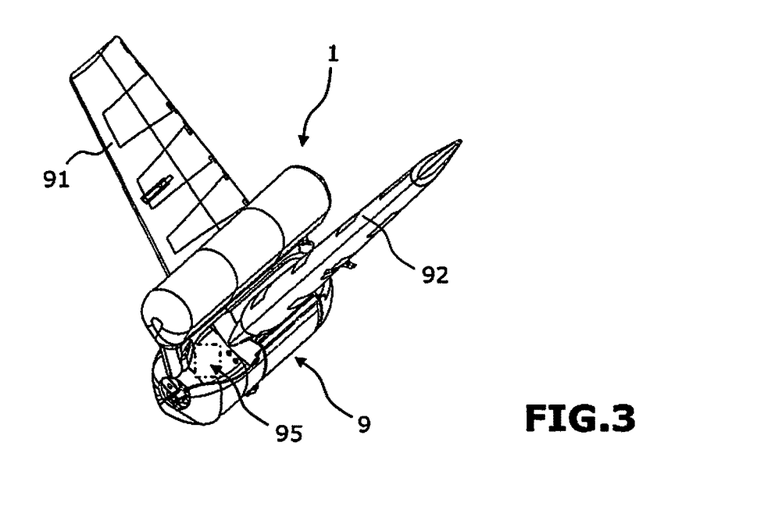
FIG. 3 is a perspective view of an assembly comprising a marine equipment and a retriever system according to an embodiment of the invention.

FIG. 3 illustrates an embodiment, wherein the marine equipment is a control device, referred to as a bird 9. The marine equipment provided with the retriever system 1, may also be a streamer or part of a streamer. Therefore, the following specification that is made with regard to a bird 9 also applies to other marine equipment, such as a streamer, that may be provided with the retriever system.

In the embodiment illustrated at FIG. 3, the bird 9 has two wings 91, 92 for controlling the position of an instrumented cable, referred to as a streamer, adapted to be towed in water. The retriever system 1 extends between said at least two wings 91, 92 of the bird 9. The longitudinal axis of the retriever is parallel to the longitudinal axis of the bird.

As explained hereinafter, the bird 9 may also include a pressure detection system 95.

Figure 4:
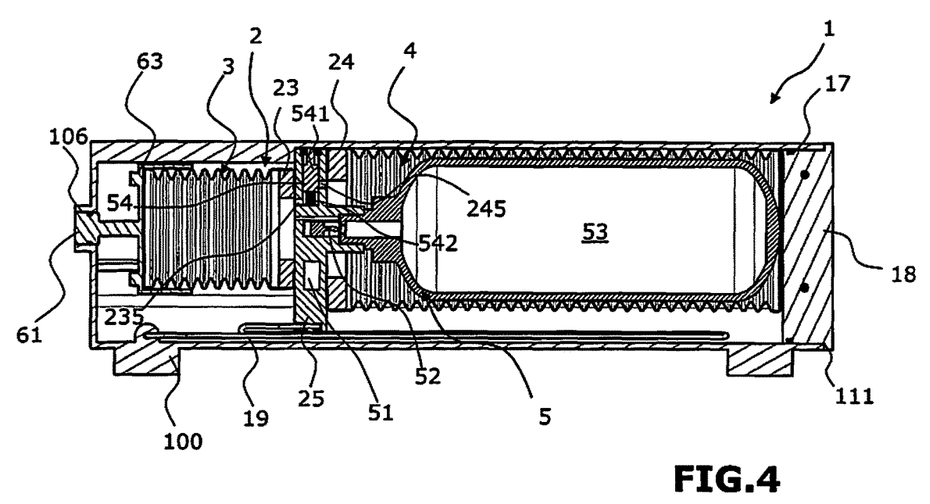
FIG. 4 is a cross sectional view of a retriever system according to an embodiment of the invention, in a configuration wherein a buoyancy assembly is contained in a hollow body having an opening closed by a cap, for instance in a storage or navigation state of the retriever system.

As illustrated in the embodiment of FIG. 4, the retriever system 1 comprises a hollow body 100. The hollow body 100 can be elongated. For instance, the hollow body has a general tubular or cylindrical shape. According to another embodiment, the shape may be not completely cylindrical but rather with a bulb shape.

The hollow body 100 has a first opening 111 at a first extremity. A cap 18 enables to close the first opening 111, as shown in particular in FIG. 4 and FIG. 5, while at FIGS. 5A, 5B and 6 the cap 18 has been removed.

According to a particular aspect, the retriever system 1 comprises an attachment system 17, for instance a pin or a plastic screw, configured to enable attachment of the cap 18 to the hollow body 100 in a position wherein the cap 18 closes said opening 111. The attachment system 17 avoids non-desired ejection of the cap, in particular on board the vessel in a storage state of the retriever system 1.

The attachment system 17 is configured for failing in predefined conditions, in particular when a predefined force or pressure is applied to the cap 18.

Buoyancy Assembly

A buoyancy assembly 2 is housed in the hollow body 100. The buoyancy assembly 2 is adapted to exit the hollow body 100 when the cap 18 is removed.

A linkage system 19 enables to maintain the buoyancy assembly 2 linked to the hollow body 100 of the retriever system 1, in particular when said buoyancy assembly 2 is out of said hollow body 100. The linkage system 19 may comprise a flexible link, extensible or not, such as a rope, wire, string or cord.

According to embodiments, the buoyancy assembly 2 comprises a first inflatable element 3 and a second inflatable element 4.

Figure 5:
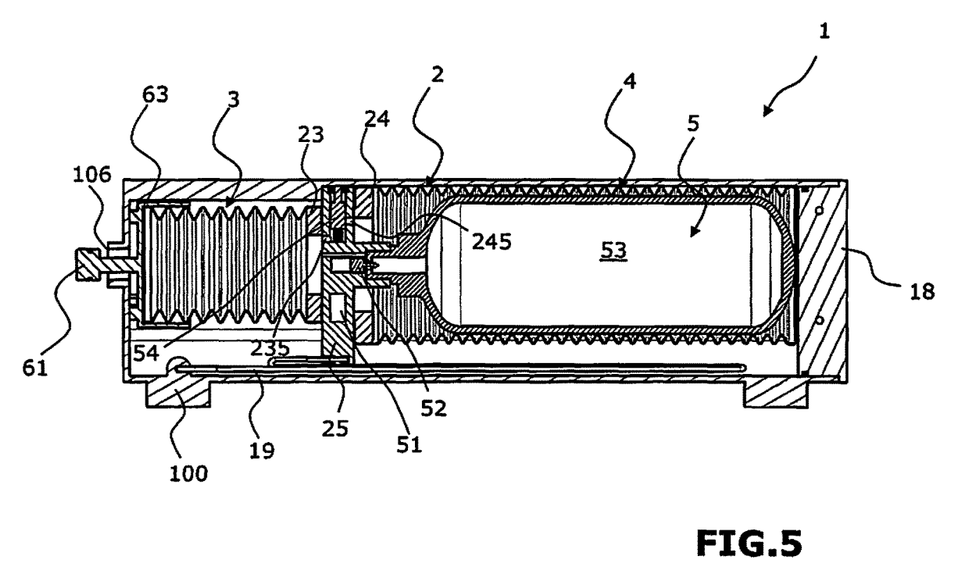
FIG. 5 is a cross sectional view of a retriever system according to an embodiment of the invention, in a configuration wherein a valve system is moved in an open position by an inflated element.
Figure 6:
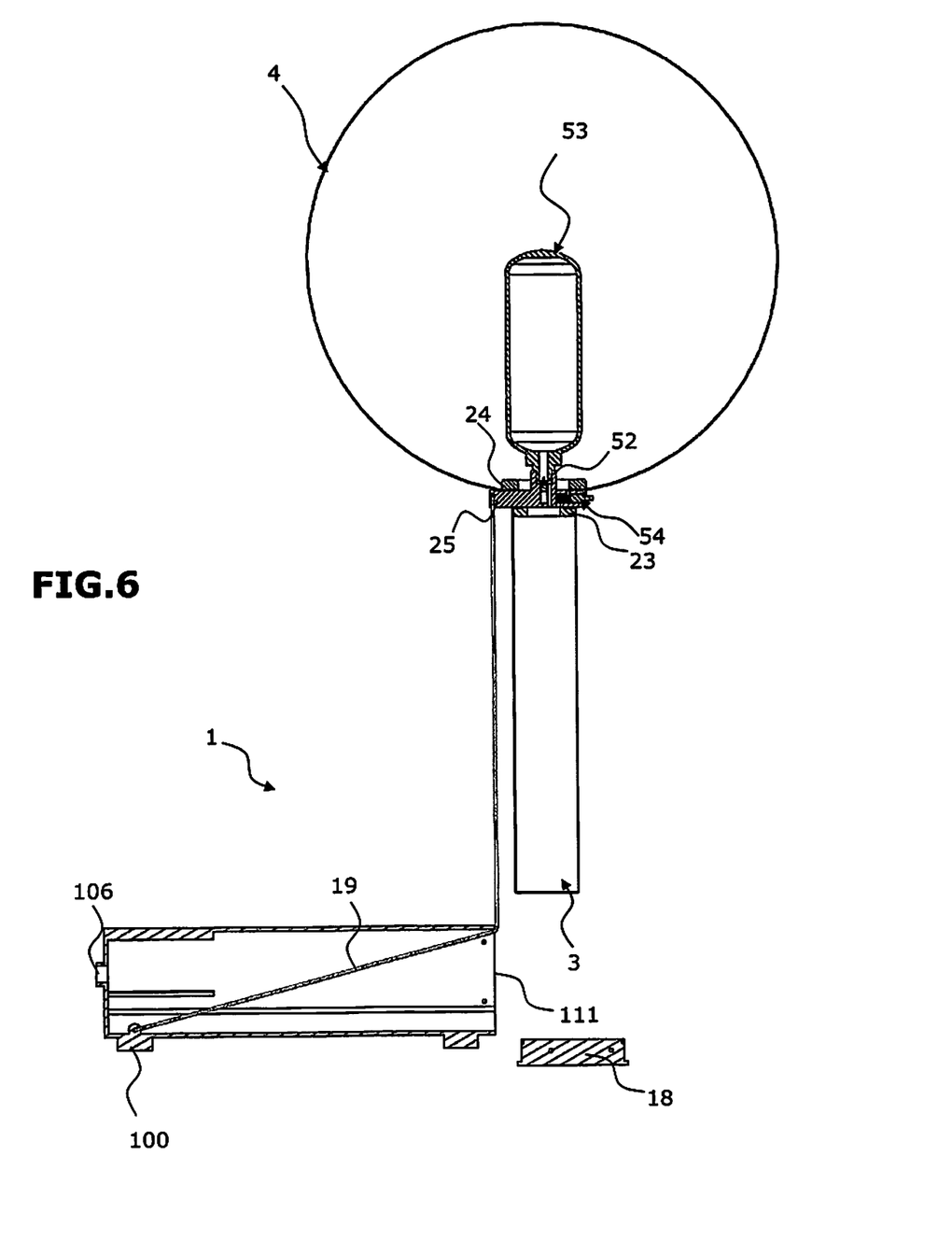
FIG. 6 is a cross sectional view of a retriever system according to an embodiment of the invention, in a configuration wherein a buoyancy assembly has exited the hollow body of the retriever system, while remaining attached to the hollow body.

In the embodiments of FIGS. 4 to 6, the first inflatable element 3 is a foldable element. In particular, the first inflatable element 3 is folded when the buoyancy assembly 2 is positioned in the hollow body 100 without being inflated (FIG. 4), and can be unfolded by being inflated (FIGS. 5 to 6), what causes the buoyancy assembly 2 to exit the hollow body 100 as explained hereinafter. In the embodiments of FIGS. 4 to 6, the second inflatable element 4 is also a foldable element.

According to an embodiment and as illustrated in particular at FIG. 6, the first inflatable element 3 is configured to, when inflated and having exited the hollow body 100, present an elongated shape.

For instance, the first inflatable element 3 has a cylindrical shape with a circular cross section. According to an embodiment and as illustrated at FIG. 6, the second inflatable element 4 is configured to, when inflated and having exited the hollow body 100, present a spherical shape.

The retriever system 1 comprises an inflating system 5 that includes an inflating generator and an activation system 51, 52 to activate the inflating generator to provide the first inflatable element 3 with pressurized fluid and, at a later stage, provide the second inflatable element 4 with pressurized fluid, as explained to hereinafter.

The inflating generator can comprise a pressurized gas bottle 53 or a mechanism to cause specific substance, such as powder or liquid or a solid compound, to react with another substance, and generate gas usable to inflate the first inflatable element 3 and the second inflatable element 4.

According to embodiments, at least part of the inflating system 5 is inside the second inflatable element 4. In particular and as illustrated in FIGS. 4 to 6, the inflating generator, for instance a pressurized gas bottle, extends inside the second inflatable element 4.

Interface System

The first inflatable element 3 and the second inflatable element 4 are coupled one to the other by a coupling system.

According to embodiments, the coupling system comprises a first annular element 23, a second annular element 24 and between said first and second annular elements, an intermediate element 25. In particular, an opening of the first inflatable element 3 is fixed to the first annular element 23, and an opening of the second inflatable element 4 is fixed to the second annular element 24. First annular element 23, second annular element 24 and intermediate element 25 may be connected one to the other or being parts of a same element.

According to embodiments, the coupling system, in particular the intermediate element 25 as illustrated at FIGS. 4 to 6, supports or receive the activation system 51, 52.

A gas communication path is provided in the coupling system to allow the gas coming from the inflating generator to pass from the first inflatable element 3 to the second inflatable element 4.

As explained hereinafter, a valve mechanism 54 enables to close or open the gas communication path.

In particular, the annular opening of the first annular element 23 communicates with the interior of the first inflatable element 3 and the annular opening of the second annular element 24 communicates with the interior of the second inflatable element 4.

According to the embodiments illustrated at FIGS. 4 to 6, the intermediate element 25 has a gas path 235 that communicates with the annular opening of first annular element 23, and thus with the interior of first inflatable element 3, and a gas path 245 that communicates with the annular opening of second annular element 24, and thus with the interior of second inflatable element 4.

Inflating System

Activation system 51, 52 of the inflating system 5 may comprise a puncturing system 52 and a pyroelectric actuator 51 to command the puncturing system 52 so as to cause perforation of the inflating generator. puncturing system 52 can comprise a punch or puncturing element that enables to open a gas pressurized bottle 53 (as an example of inflating generator) as a result of an activation of the pyroelectric actuator 51.

Activation of the inflating generator provides gas to the first inflatable element 3 and, as explained hereafter, when a valve mechanism 54 is moved in an open position, to the second inflatable element 4.

The hollow body 100 and the buoyancy assembly 2 may be arranged so that, when the first inflatable element 3 is in a rest position, and that the inflating system 5 is activated, the first inflatable element 3 begins to be inflated by expanding inside the hollow body 100 (see for instance FIG. 5).

The inflating system 5 comprises a valve mechanism 54 that is configured to prevent inflating of the second inflatable element 4 while the second inflatable element 4 has not exited the hollow body. In the embodiments of FIGS. 4 to 6, the valve mechanism 54 is arranged so as to open the gas communication path after the second inflatable element 4 has entirely exited the hollow body 100.

According to another embodiment, the valve mechanism 54 that controls the opening or closure of the gas communication path between first and second inflatable elements, may be configured to prevent inflating of the second inflatable element while said valve mechanism 54, or said gas communication path, is submitted to a pressure that is under a predefined threshold, and to enable said inflating of the second inflatable element when said pressure reaches or exceeds said predefined threshold. In that case the pressure threshold may be settled in function of the technical features of the first inflatable element and of the second inflatable element. In particular the pressure threshold associated with the valve mechanism can be settled so as to let the second inflatable element exit the hollow body before inflation of said second inflatable element. According to embodiments, the pressure threshold associated with the second inflatable element may be settled so that the second inflatable element has exited the hollow body before that the internal pressure of said second inflatable element exceeds a predefined pressure value that may compromise or interfere with a safe exit of the second inflatable element from the hollow body.

In particular, while the second inflatable element 4 is contained in the hollow body, the valve mechanism 54 closes communication between paths 235, 245, and thus, communication between the first inflatable element 3 and the second inflatable element 4 is closed.

According to embodiments, the valve mechanism 54 is positioned in the buoyancy assembly 2 between the first inflatable element 3 and the second inflatable element 4.

In particular, the valve mechanism 54 is positioned upstream the second inflatable element 4 by reference with the exit direction of the buoyancy assembly 2 with regard to the hollow body 100.

According to particular embodiment, the valve mechanism 54 is positioned proximate the extremity of the second inflatable element 4 that is opposite to the cap 18.

According to embodiments, and as disclosed in FIGS. 4 to 6, the valve mechanism 54 includes a spring 542 and a closing element 541, also referred to as a spring-loaded finger. The closing element is movable between a closing position wherein the closing element 541 closes the gas communication path between the first inflatable element 3 and the second inflatable element 4, and an opening position wherein the closing element 541 frees the gas communication path between the first inflatable element 3 and the second inflatable element 4.

When the buoyancy assembly 2 is housed in the hollow body 100, the closing element 541 is maintained in the closing position by the internal wall of the hollow body 100, thus preventing the closing element 541 to be moved (along a radial path of the buoyancy assembly) by the spring 542 in the opening position. The spring 542 is thus maintained in a loaded state by the hollow body 10 as the closing element 541 is maintained in the closing position by the hollow body 10.

When the portion of the buoyancy assembly 2 that has the valve mechanism 54, has exited the hollow body 100, the internal wall of the hollow is no more in contact with the closing element 541 so that the closing element 541 is moved in the open position by the spring 542 that unloads. The gas communication path is thus free.

The valve mechanism 54 thus enables to control the gas communication between first inflatable element 3 and second inflatable element 4.

When activated, inflating system 5 causes inflation of the first inflatable element 3. Inflation of the first inflatable element 3 causes the buoyancy assembly 2 to push onto the cap 18 (FIG. 5), what leads to the ejection of the cap (FIG. 5A) when the force or pressure exerted by the buoyancy assembly 2 on the cap 18 is superior to a force or pressure threshold.

According to embodiment said force or pressure threshold corresponds to a force or pressure necessary to brake the attachment system 17 arranged between the cap 18 and the hollow body 100. The attachment system 17 can comprise a screw, such as a plastic screw cooperating with a thread arranged in the cap.

As illustrated in the embodiment of FIGS. 4 to 6, the pressurized gas bottle 53 is fixed to the coupling system so that the pressure inside the inflatable first element 3 generates a force that is transmitted to the pressurized gas bottle 53 that, as a result, pushes onto the cap 18.

Once the cap 18 has been ejected, the buoyancy assembly 2 exits out of the hollow body 100 (FIG. 6).

According to embodiments, the inflating system 5 is configured to start inflating the second inflatable element 4 when said second inflatable element 4 is out of the hollow body 100.

According to another embodiment, the second inflatable element 4 may start inflating a little in the hollow body 100 while the cap 18 has not yet been ejected. Once the cap 18 is ejected and that the second inflatable element 4 has exited the hollow body 100, inflation of said second inflatable element can continue outside the hollow body 100.

Such conception of the retriever system 1 enables to cause the second inflatable element 4 to exit the hollow body 100 when the first inflatable element 3 is being inflated or is inflated and that the cap 18 is removed/expulsed, while the second inflatable element 4 has not yet started to inflate or has inflated just a little, thus preventing the second inflatable element 4 from being damaged, for instance by being cut by the edge of the opening 111, when exiting the hollow body.

Figure 5A:
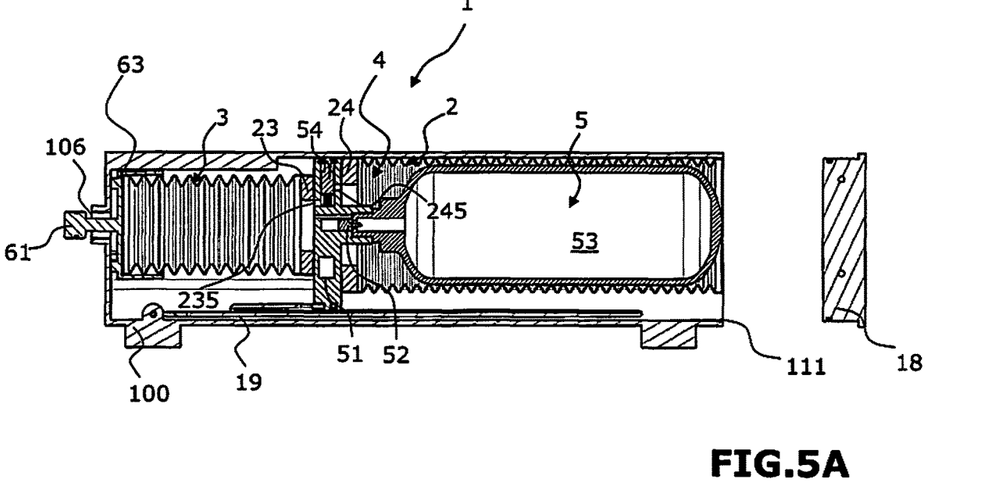
FIG. 5A is a cross sectional view of a retriever system according to an embodiment of the invention, in a configuration wherein a first inflatable element of a buoyancy assembly inflates inside the hollow body of the retriever system, causing expulsion of a closure cap at an extremity of the hollow body.
Figure 5B:
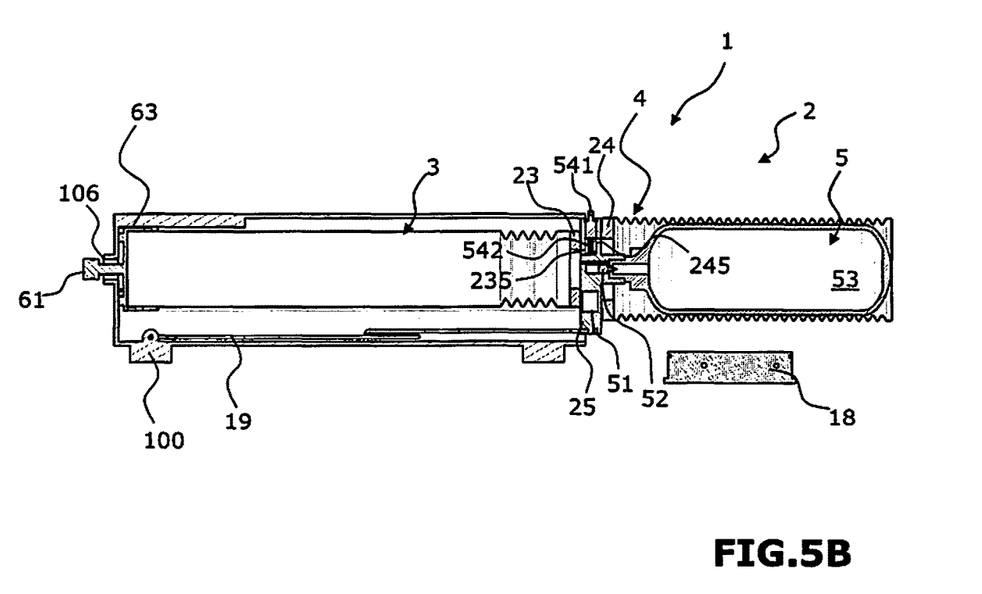
FIG. 5B is a cross sectional view of a retriever system according to an embodiment of the invention, in a configuration wherein a buoyancy assembly is exiting the hollow body of the retriever system.

Activation of the inflation system 5 causes the first inflatable element 3 to inflate (FIG. 5), what causes the cap 18 to be ejected as a result of the force applied by the buoyancy assembly 2 on the interior face of the cap 18 (FIG. 5A). Then, the buoyancy assembly 2 begins to exit the hollow body 100, having the second inflatable element 4, that was arranged proximate to the now expulsed cap 18, exiting first the hollow body. Thanks to the positioning of the valve mechanism 54 between the first and second inflatable elements 3, 4, when the part of the buoyancy assembly that supports the valve mechanism 54 has exited the hollow body, the second inflatable elements has already exited the hollow body, and the valve mechanism 54 automatically switches on the opened position that frees the communication between the first inflatable element 3 and the second inflatable element 4 (FIG. 5B). The pressurized gas contained in the pressurized gas bottle 53 thus flows from the first inflatable element 3 to the second inflatable element 4 causing the second inflatable element 4 to inflate (FIG. 6).

As illustrated at FIG. 6, when inflated, the second inflatable element 4 may have a volume greater than the one of the first inflatable element 3.

Valve System

The retriever system comprises a valve system 61 that enables, when opened, to equalize pressure inside and outside the hollow body. The valve system 61 can be moved between a closed position wherein the valve system 61 closes a second opening 106 of the hollow body 100, and an opened position wherein said second opening 106 of the hollow body 100 is opened so as to let external water enter the hollow body 100.

As illustrated in the embodiments of FIGS. 4 to 6, the second opening 106 is opposite to the first opening 111.

In the opened position of the valve system 61, water fills the hollow-body around the buoyancy assembly 2. As a result, pressure inside and outside the hollow body is equalized, what makes easier the ejection of cap 18.

The first inflatable element 3 is configured to, when being inflated, move the valve 61 system from the closed position to the opened position.

The retriever system 1 comprises a coupling interface 63 that is coupled to the valve 61 system and that partially covers the first inflatable element 3 to enable guiding of the movement of the valve 61 system from the closed position to the opened position when the first inflatable element 3 is inflating. In particular, the first inflatable element 3 unfolds by being inflated what causes the first inflatable element 3 to push onto the coupling interface 63 that supports the valve 61 system.

However, the coupling interface 63 is designed to let the first inflatable element 3 exits out of the hollow body 100 through the first opening 111 once the cap 18 is removed. In other words, the coupling interface does not restrain movement of the buoyancy assembly in the direction of the cap.

According to embodiments, the retriever system 1 is configured to activate the inflating system 5 at a predefined depth to cause inflation of the first inflatable element 3, what moves the valve 61 system in the opened position. The predefined depth may correspond to high depth. The predefined depth may for instance be between 80 and 90 meters, in particular when considering seismic applications.

The area of the outer surface of the cap 18, that corresponds to the surface of the cap that is in contact with water when in a closing position of the cap and when the retriever system 1 is underwater, before opening of the valve 61 system, can be defined in function of (i) the area of the outer surface of the valve 61 system, that corresponds to the surface of the valve 61 system that is in contact with water when in the closed position of the valve system and when the retriever is underwater, and (ii) the water depth, or corresponding pressure, at which the inflating system 5 is intended to be activated.

The value of the ratio of the area of the outer surface of the cap 18 and the area of the outer surface of the valve 61 system may for instance be about 100.

Contrary to some state-of-the-art retriever systems that cannot work at high depth because required pressure to release airbag equals external water pressure, the valve system 61 of the retriever system according to embodiments enables the retriever system to be activated at high depth.

Activation of the Inflating System

According to a particular embodiment and as illustrated at FIG. 3, the bird 9 comprises a pressure detection system 95. The pressure detection system 95 is configured to detect or measure the water pressure on the marine equipment.

The inflating system 5 may be configured to be activated in function of a pressure detected by a pressure detection system such as said pressure detection system 95. In particular, the bird 9 may be configured to send an activation signal (also called trigger command) to the activating system 51, 52 of the inflating system 5 The pressure detection system 95 of the bird may communicate with the activating system 51, 52 of the inflating system 5 with radio means or with connectors such as wire(s).

The activation system 51, 52 may be configured to activate the inflating generator in predefined conditions. Predefined condition can include part or combination of the following events:
- a receiver of the bird or a receiver of the retriever system receives a remote command to actuate the inflating system 5. The remote command may be emitted from remote device, for instance on board a vessel,
- a physical parameter, such as pressure outside the bird, exceeds a threshold and a corresponding detection system, that can be integrated or deported from the retriever system, triggers the activation system 51, 52.

The retriever system 1 can include a pressure detection system that is configured to activate the activation system 51, 52 of the inflating system 5 in function of the pressure detected or measured by said pressure detection system.

In another embodiment, the activation system 51, 52 of the inflating system 5 may be associated with a radio receiver included in the retriever system 1 and adapted to receive an activation signal from a remote transmitter, for instance positioned on board a vessel, and to control the activation system 51, 52 based on said received activation signal. Activation system 51, 52 of the inflating system 5 may also be configured to be manually controlled by an operator.

Method

An embodiment of a method for retrieving a marine equipment that can be executed with a retriever system 1 according to various embodiments recited above, is now discussed. The method includes a step of activating the activation system 51, 52. In particular, the pyroelectric actuator 51 causes the puncturing system 52 to perforate the inflating generator (see FIG. 5). Then the gas exiting the inflating generator fills and unfolds the first inflatable element 3.

In case the retriever system is provided with the valve system 61 and corresponding coupling interface 63, inflating of the first inflatable element 3 causes the valve 61 system to be moved in the open position by being pushed by the first inflatable element 3. Then water enters the hollow body trough opening 106 and fills the hollow body around the buoyancy assembly 2. Thus, pressure tends to equalize between inside and outside the hollow body 100 (or container) and reduce the effort needed to open (or eject) the cap 18.

Inflating of the first inflatable element 3 make the first inflatable element 3 extend and thus first inflatable element 3 pushes the buoyancy assembly, and in particular the inflating generator, against the cap 18. The cap 18 is then ejected from the hollow body. When the cap 18 is ejected, first opening 111 is free and the buoyancy assembly 2 can exit the hollow body 100.

According to a preferred embodiment, expulsion or removing of the cap results from the inflating of the first inflatable element 3. But according to other embodiments, the cap may be expulsed by other means independently of the inflating, for instance by a pressure mechanism coupled to that cap and that is automatically activated on a pressure threshold to cause the ejection of the cap.

Once the portion of the buoyancy assembly that has the valve mechanism 54, has exited the hollow body, the valve mechanism 54 moves in an open position that enables to inflate the second inflatable element 4 that has exited the hollow body 100. In particular the finger that was blocking the gas communication path between first inflatable element 3 and second inflatable element 4, is moved by its associated spring away from the communication path so that gas can pass from the first inflatable element 3 to second inflatable element 4.

In other words, the first and second inflatable elements are inflated in a two-time sequence.

According to embodiments, the retriever system 1 can be configured so that, when the inflating system 5 is activated, the first inflatable element 3 is inflated at least partially before inflation of the second inflatable element 4, so as to let the second inflatable element 4 exit the hollow body 100 before inflation of said second inflatable element 4 or before that the internal pressure of said second inflatable element 4 exceeds a predefined threshold.

PARTICULAR EMBODIMENT

According to a particular embodiment, the retriever system comprises a hollow body and a cap as explained above. The buoyancy assembly may comprise an inflatable element, for instance only one inflatable element or a plurality, and an inflating system configured to, when activated, inflate said inflatable element. Inflating system may be as recited above. In this particular embodiment the retriever system comprises a valve system that can be moved between a closed position wherein the valve system closes a second opening of the hollow body, and an opened position wherein said second opening of the hollow body is opened so as to let external water enter the hollow body.

The inflatable element is configured to, when being inflated, move the valve system from the closed position to the opened position. The inflatable element can be a foldable bag as proposed in the other embodiments. The inflatable element may be designed so that entering of the water in the hollow body enables the inflatable element to eject the cap so as to let the inflatable element exit the hollow body while remaining linked to the hollow body.

The retriever system proposed in the above embodiment may be used to execute a method for retrieving a marine equipment coupled to a retriever system. The method comprises a step of inflating the inflatable element to move the valve system from the closed position to the opened position that lets external water enter the hollow body. Then the cap is ejected by the force exerted by the inflatable element directly or indirectly on the cap. The inflatable element exits the hollow body while remaining linked to the hollow body.

According to embodiments, the retriever system provides a compact retriever that limit acoustic and mechanical noise on seismic acquisition. Reduced dimension of the retriever system enables the retriever system to be positioned on the body of the bird, in particular between two wings of the bird. Noise on seismic sensors is minimized. Compacity of the retriever system allows its storing and easy handling on deck. Similarly, using low weight material, such as composite material, for designing the hollow body of the system retriever enable to ease its handling on deck.

The disclosed embodiments provide a retriever system and a method for retrieving a marine equipment. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The invention claimed is:

1. A retriever system for retrieving a marine equipment, said retriever system comprising:
   a hollow body having a first opening,
   a cap adapted to close the first opening of the hollow body and adapted to be removed to free said first opening,
   a buoyancy assembly housed in the hollow body and adapted to exit the hollow body when the cap is removed,
   a linkage system to maintain the buoyancy assembly linked to the hollow body of the retriever system, when said buoyancy assembly is out of said hollow body of the retriever system,
   wherein said buoyancy assembly comprises:
      a first inflatable element and a second inflatable element,
      an inflating system configured to, when activated, inflate the first inflatable element, so as to enable exiting of at least the second inflatable element of the buoyancy assembly out of the hollow body, said inflating system being configured to start or to continue inflating the second inflatable element when said second inflatable element is out of the hollow body.

2. The retriever system according to claim 1, wherein the retriever system is configured so that, when the inflating system is activated, the first inflatable element is inflated at least partially before inflation of the second inflatable element.

3. The retriever system according to claim 1, wherein, the retriever system comprises a valve system that can be moved between:
   a closed position wherein the valve system closes a second opening of the hollow body, and
   an opened position wherein said second opening of the hollow body is opened so as to let external water enter the hollow body.

4. The retriever system according to claim 3, wherein the first inflatable element is configured to, when being inflated, move the valve system from its closed position to the opened position.

5. The retriever system according to claim 4, wherein the retriever system comprises a coupling interface that is coupled to the valve system and that partially covers the first inflatable element when the cap closes the first opening of the hollow body, to enable guiding of the movement of the valve system from the closed position to the opened position when the first inflatable element is inflating, while letting the first inflatable element exit out the hollow body through the first opening once the cap is removed.

6. The retriever system according to claim 3, wherein an area of an outer surface of the cap, that corresponds to a surface of the cap that is in contact with water when in a closing position of the cap and when the retriever system is underwater, is defined in function of:
   an area of an outer surface of the valve system, that corresponds to a surface of the valve system that is in contact with water when in the closed position of the valve system and when the retriever system is underwater, and
   water depth, or corresponding pressure, at which the inflating system is intended to be activated.

7. The retriever system according to claim 1, wherein, the inflating system comprises:
   an inflating generator and an activation system to activate the inflating generator to provide the first inflatable element with gas;
   and a valve mechanism that is configured to:
   prevent inflating of the second inflatable element while said second inflatable element extends inside the hollow body, and
   enable said inflating of the second inflatable element after the second inflatable element has exited the hollow body.

8. The retriever system according to claim 7, wherein the valve mechanism includes a spring and a closing element that is movable between a closing position wherein the closing element closes a gas communication path between the first inflatable element and the second inflatable element, and an opening position wherein the closing element frees the gas communication path between the first inflatable element and the second inflatable element,
   wherein, when the buoyancy assembly is housed in the hollow body, the closing element is maintained in the closing position by the hollow body that prevents the closing element to be moved by the spring in the opening position, and,
   when the portion of the buoyancy assembly that has the valve mechanism, has exited the hollow body, the closing element is moved in the open position by said spring to free the gas communication path.

9. The retriever system according to claim 1, wherein at least part of the inflating system is inside the second inflatable element.

10. The retriever system according to claim 1, wherein the first inflatable element is configured to, when inflated and having exited the hollow body, present an elongated shape.

11. The retriever system according to claim 1, wherein the second inflatable element is configured to, when inflated and having exited the hollow body, present a spherical shape.

12. The retriever system according to claim 1, wherein the retriever system comprises an attachment system, for instance a pin or a plastic screw, configured to enable attachment of the cap to the hollow body in a position wherein the cap closes said opening, said attachment system being configured for failing in predefined conditions, for instance when a predefined force or pressure is applied to the cap.

13. An assembly comprising:
a marine equipment, and
a retriever system according to claim 1, said retriever system being coupled to said marine equipment.

14. The assembly of claim 13, wherein, the marine equipment being a control device, referred to as a bird, having at least two wings for controlling the position of an instrumented cable, referred to as a streamer, adapted to be towed in water, the retriever system extends between said at least two wings of the control device.

15. The assembly of claim 14, wherein, the marine equipment comprising a pressure detection system, the inflating system is configured to be activated in function of a pressure detected by said pressure detection system.

16. A method for retrieving a marine equipment coupled to a retriever system according to claim 1, wherein the method comprises the following steps:
inflating the first inflatable element causing exit, from the hollow body, of at least the second inflatable element of the buoyancy assembly, and
inflating the second inflatable element that has exited the hollow body.

17. A retriever system for retrieving a marine equipment, said retriever system comprising:
a hollow body having a first opening,
a cap adapted to close the first opening of the hollow body and adapted to be removed to free said first opening,
a buoyancy assembly housed in the hollow body and adapted to exit the hollow body when the cap is removed,
a linkage system to maintain the buoyancy assembly linked to the hollow body of the retriever system, when said buoyancy assembly is out of said hollow body of the retriever system,
wherein said buoyancy assembly comprises:
an inflatable element,
an inflating system configured to, when activated, inflate said inflatable element,
a valve system that can be moved between:
a closed position wherein the valve system closes a second opening of the hollow body, and
an opened position wherein said second opening of the hollow body is opened so as to let external water enter the hollow body, the inflatable element being configured to, when being inflated, move the valve system from the closed position to the opened position.

18. A method for retrieving a marine equipment coupled to a retriever system according to claim 17, wherein the method comprises inflating said inflatable element to move the valve system from the closed position to the opened position that lets external water enter the hollow body so as to ease expulsion of the cap by the force exerted by the inflatable element directly or indirectly on the cap.

* * * * *